Feb. 17, 1970  MORIMASA HANAYA  3,495,878
FLEXIBLE PIPE APPARATUS FOR PNEUMATICALLY
CONVEYING BULK MATERIAL
Filed July 8, 1968  4 Sheets-Sheet 1
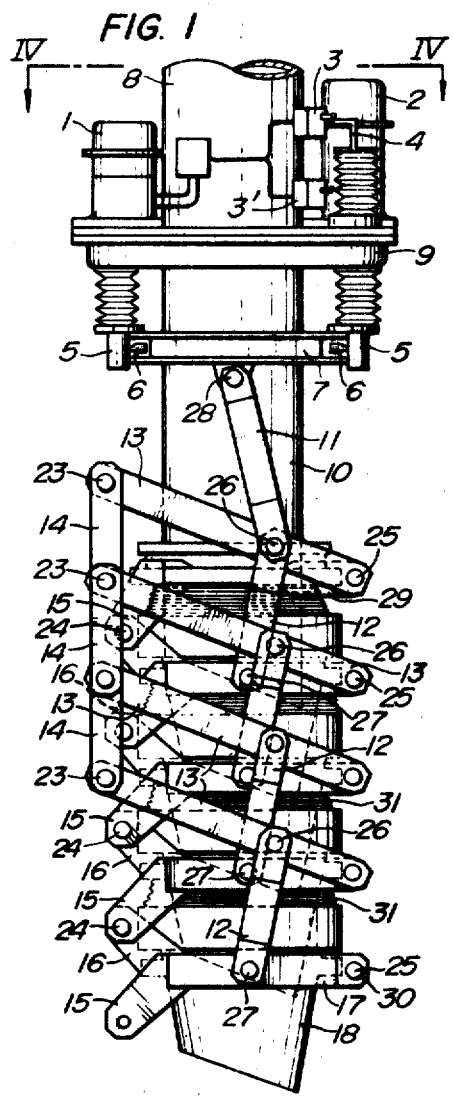
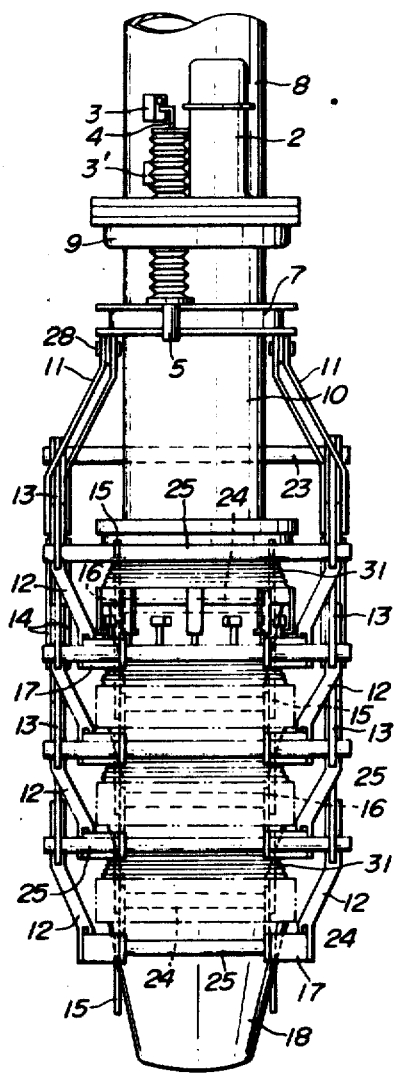
INVENTOR
MORIMASA HANAYA
BY Cushman, Darby & Cushman
ATTORNEYS

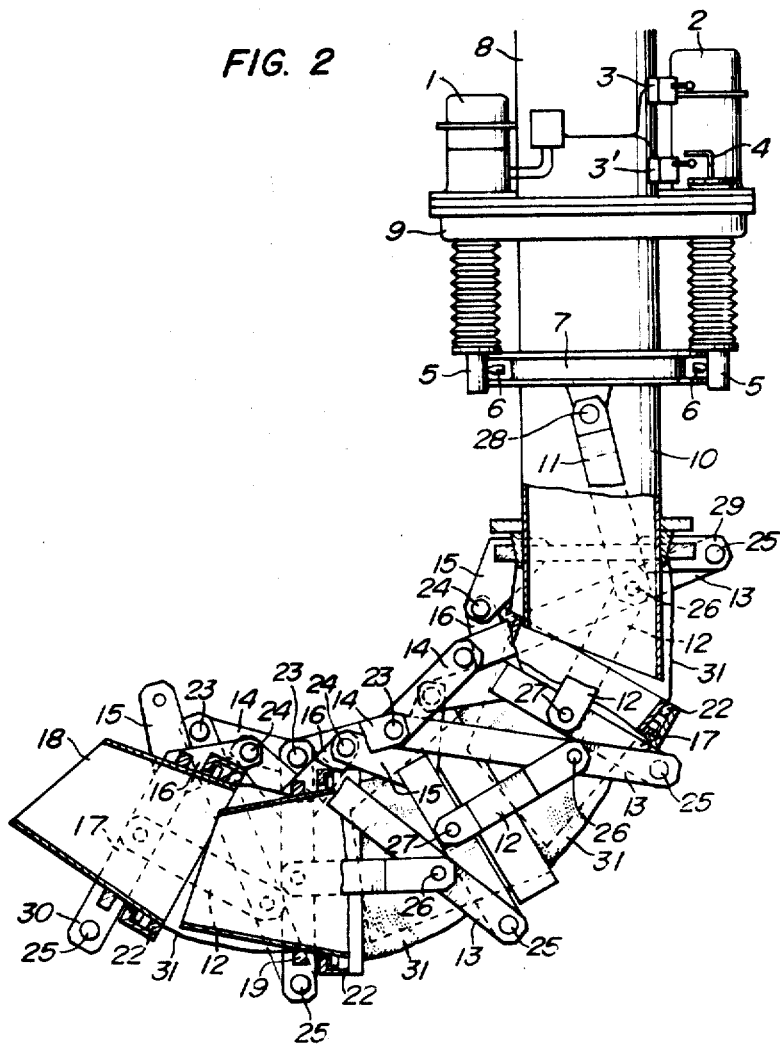

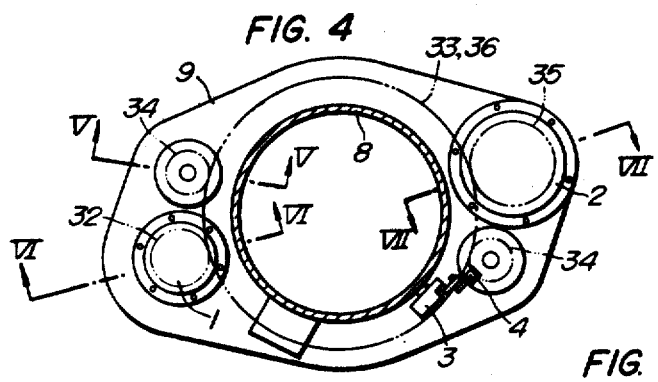
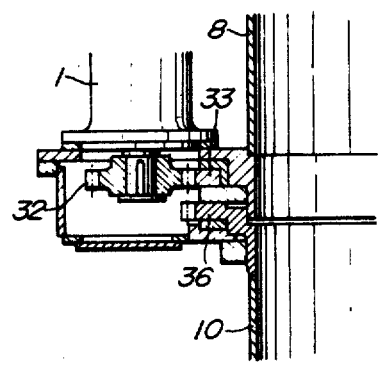
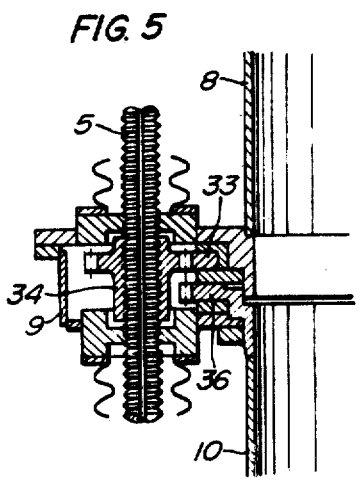
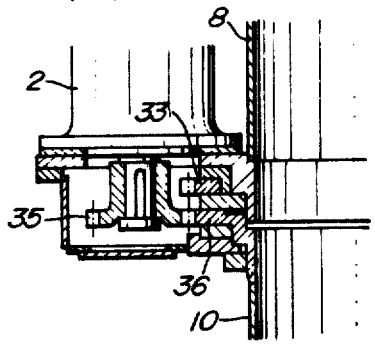

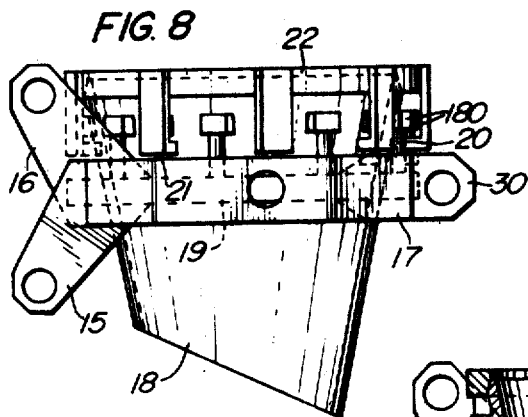
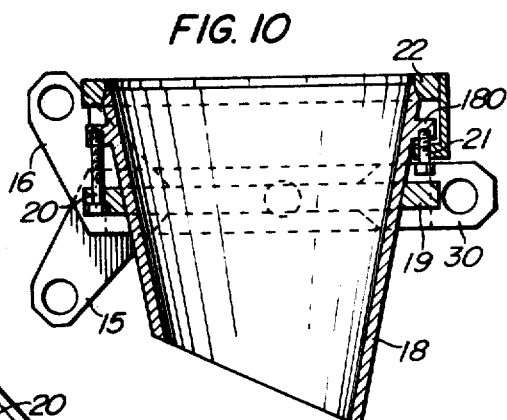
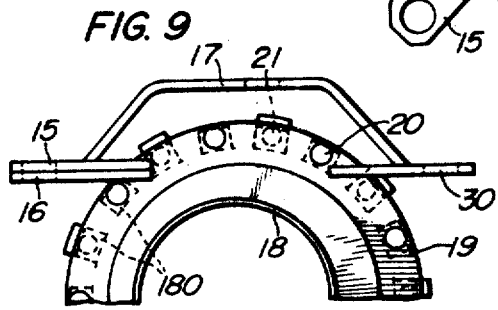
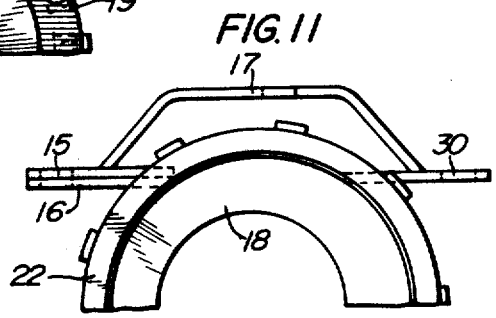

United States Patent Office 3,495,878
Patented Feb. 17, 1970

1

3,495,878
FLEXIBLE PIPE APPARATUS FOR PNEUMATI-
CALLY CONVEYING BULK MATERIAL
Morimasa Hanaya, Kure-shi, Japan, assignor to Toyo
Pulp Co., Ltd., Tokyo, Japan
Filed July 8, 1968, Ser. No. 743,218
Claims priority, application Japan, July 10, 1967,
42/44,058
Int. Cl. B65g 53/42; A01f 25/14; B65a 11/12
U.S. Cl. 302—61                     3 Claims

ABSTRACT OF THE DISCLOSURE

A flexible pipe apparatus for pneumatically conveying bulk material having a revolving pipe revolvably connected to the opposite end of a stationary pipe, and a flexuously bendable pipe unit connected to the opposite end of the revolving pipe and consisting of a plurality of chute pipes sealingly connected with each other by flexible air tight members. In the flexible pipe apparatus, the flexuously bendable pipe unit can be revolved integrally with the revolving pipe and can also be bent in any desired arcuate shape by an elevating link mechanism operatively connected with the flexuously bendable pipe unit.

This invention relates to the art of pneumatically conveying bulk material such as, for example, wood chips, coal, coke, wheat, rice, sugar or salt, and more particularly to flexible pipe apparatus for the pneumatic conveyance of such a bulk material as described above, having a tubular body which is operatively associated with a source of drive power so that the tubular body can freely be revolved in any desired direction and flexuously bent through any desired angle by the drive power.

Conventional flexible pipe apparatus for the pneumatic conveyance of bulk material have been so constructed that a flexible pipe is connected with the lower end of a rigid bent pipe or the like which is connected with a pneumatic conevyor line and is supported in a liftable upper structure. In the operation with sucs a conventional pipe apparatus, the upper structure is lifted about its pivotal axis in order that the flexible pipe depending from the upper structure can be flexuously bent in a suitable shape by the force of gravity for the suction or discharge of bulk material. With the prior art flexible pipe apparatus, therefore, it has been unable to forcedly bend the flexible pipe through a desired angle.

Deflector apparatus employed heretofore for the forced transport of bulk material such as wood chips have been so arranged that the angular position of the deflector with respect to the axis of a pneumatic transport pipe is varied to vary the discharge angle of the wood chips being discharged through the pneumatic transport pipe. However, because of the fact that the deflector itself is nothing but a deflecting plate against which the wood chips are made to impinge to be deflected in the discharging direction and that an excessively great friction loss results when the wood chips change their moving direction by impinging against the deflecting plate, it has been inevitable that the chip flow velocity is thereby reduced and thus there has been a certain limitation in the chip discharge angle, or more practically, it has only been possible to vary the discharge angle up to a maximum of about 60° to 70°.

The present invention contemplates the provision of a pipe apparatus for the pneumatic conveyance of bulk material which comprises a stationary pipe, a revolving pipe revolvably connected at the upper end thereof with the lower end of said stationary pipe in concentric relation therewith, a one-body flexible pipe or a plurality of

2 chute pipes connected with each other to form a flexuously bendable pipe unit and render it air-tight by means of flexible impervious members, said one-body flexible pipe or said flexuously bendable pipe unit composed of said chute pipes being connected at the upper end thereof with the lower end of said revolving pipe, first drive means for causing the revolving movement of said revolving pipe and said flexible pipe or said flexuously bendable pipe unit composed of said chute pipes, second drive means for flexuously bending said flexible pipe or said flexuously bendable pipe unit composed of said chute pipes thereby causing elevating movement of the lower end of the latter, and an elevating link mechanism operatively connected with said flexible pipe or said flexuously bendable pipe unit composed of said chute pipes and operative in response to the operation of each second drive means to cause the elevating movement of the lower end of said flexible pipe or said flexuously bendable pipe unit composed of said chute pipes, whereby said flexible pipe or said flexuously bendable pipe unit composed of said chute pipes can be revolved in unitary relation with said revolving pipe and can forcedly be bent through any desired angle between 0° and 180° thereby facilitating the pneumatic conveyance of bulk material in any desired direction.

It is therefore an object of the present invention to provide a pipe apparatus for the pneumatic conveyance of bulk material which makes possible to pneumatically convey the bulk material to every corner of a stowage area which has heretofore been left as a dead space because of the incapability of prior apparatus to pneumatically convey bulk material to such a place.

Another object of the present invention is to provide a pipe apparatus of the kind described in which the heretofore employed stationary bent pipe is replaced by a flexible pipe or a flexuously bendable pipe unit composed of chute pipes connected with each other and rendered air-tight by means of flexible impervious members, thereby minimizing useless pressure losses and any fluctuation in the handling capacity, improving the transportability per horsepower required for the pneumatic conveyance, and increasing the solid-air mixture ratio, thus remarkably increasing the transport capacity.

The above and other objects, advantages and features of the present invention will be apparent from the following description with reference to the accompanying drawings.

In the drawings:

FIG. 1 is a side elevational view of an embodiment of the apparatus according to the present invention in its straight position;

FIG. 2 is a side elevational view of the apparatus in its flexuously bent position;

FIG. 3 is a front elevational view of the apparatus in its straight position;

FIG. 4 is a sectional view taken on the line IV—IV in FIG. 1;

FIG. 5 is an enlarged sectional view taken on the line V—V in FIG. 4;

FIG. 6 is an enlarged sectional view taken on the line VI—VI in FIG. 4;

FIG. 7 is an enlarged sectional view taken on the line VII—VII in FIG. 4;

FIG. 8 is an enlarged side elevational view of a chute pipe and associated elements;

FIG. 9 is a bottom plan view of part of the chute pipe and the associated elements shown in FIG. 8;

FIG. 10 is an axial sectional view of the chute pipe with its associated elements; and FIG. 11 is a plan view of part of the chute pipe and the associated elements shown in FIG. 10.

Referring to FIGS. 1 to 3, the pipe apparatus embodying the present invention includes a substantially upright stationary pipe 8 connected to a pneumatic conveyor line. A revolving pipe 10 is concentrically connected with the stationary pipe 8 for revolving movement relative to the later. A gear casing 9 is disposed intermediate between the stationary pipe 8 and the revolving pipe 10, and contains therein a drive gear 35 which is in meshing engagement with a follower gear 36 which is fixedly secured to the upper end of the revolving pipe 10 as shown in FIG. 7 for causing revolving movement of the revolving pipe 10 relative to the stationary pipe 8. A motor 2 mounted on a portion of an outwardly extending flange of the gear casing 9 drives the drive gear 35 for causing the above revolving movement of the revolving pipe 10 relative to the stationary pipe 8. At a substantially diametrallly opposite position of the outwardly extending flange of the gear casing 9, there is mounted another motor 1 which is arranged to drive a drive gear 32 which, in turn, drives a follower gear 33 housed in the gear casing 9 as shown in FIG. 6. The follower gear 33 drives gears 34 so that threaded rods 5 which are vertically movably engaged by the gears 34 and restrained from rotation by a key and groove arrangement can make vertical movement in the gear casing 9 as shown in FIG. 5. The respective threaded rods 5 have projections 6 at the lower ends thereof which engage in corresponding holes in an annular member 7 surrounding the revolving pipe 10 so that the vertical movement of the threaded rods 5 can cause the corresponding vertical movement of the annular member 7 for causing the elevating movement of the lower end of a flexuously bendable portion of the pipe apparatus as hereinafter described in detail.

In order to limit the vertical movement of the threaded rods 5 beyond their upper limit and lower limit, microswitches or limit switches 3 and 3' are disposed in suitably spaced relation on the stationary pipe 8, and a striker 4 engageable with these limit switches 3 and 3' is secured to the upper end of one of the threaded rods 5 so as to stop the operation of the elevating motor 1 when either limit switch 3 or 3' is engaged by the striker 4. The motors 1 and 2 in the present invention may be any of electric motors, hydraulic motors, air motors and the like. Further, the threaded rods 5 for causing the elevating movement of the lower end of the flexuously bendable portion of the apparatus may be replaced by a directly actuatable hydraulic cylinder-piston arrangement. As a matter of fact, any desired means may be employed for effecting revolving and end-elevating movement of the flexuously bendable portion of the pipe apparatus. The essential conditions are that revolving and elevating motors are mounted adjacent to the stationary pipe to which the revolving pipe is revolvably connected and the respective motors can cause the revolving movement of the revolving pipe and the vertical movement of the annular member which actuates the flexuously bending movement of the flexuously bendable portion.

The flexuously bendable portion of the flexible pipe apparatus is disposed beneath the revolving pipe 10 and consists of a plurality of chute pipes 18 which are flexuously bendably and air-tightly connected with each other by means of fledible impervious members 31 to constitute a flexuously bendable pipe unit. The pipe 10 can be arranged not only vertically but also in any position between the vertical position and even an upwardly inclined position. In the embodiment illustrated herein, link means are employed to cause the flexuously bending movement of the flexuously bendable pipe unit from its straight position to its flexuously bent, end-elevated position. As shown in FIGS. 1 to 3, a pair of link joints 29 and a pair of link joints 15 are connected to the lower end of the revolving pipe 10 on the extensible side and on the non-extensible side of the flexuously bendable pipe unit, respectively. Each of the chute pipes 18 constituting the flexuously bendable pipe unit is provided on the extensible side of the pipe unit with a pair of link joints 30 and on the non-extensible side of the pipe unit with a pair of link joints 15 and a pair of link joints 16 similar to those provided for the revolving pipe 10. The link joints 15 and 16 disposed on the non-extensible side of each chute pipe 18 are pivotally connected with each other by a link shaft 24 so as to restrain the extension of the flexuously bendable pipe unit on that side. The link joints 30 on the extensible side of each chute pipe 18 are pivotally connected by a link shaft 25 to one end of a pair of link plates 13, while a link shaft 23 connects the other ends of the link plates 13 to a pair of connecting link plates 14 so as to restrain also the extension on that side of the flexuously bendable pipe unit.

Link joints 17 are disposed on opposite sides of each chute pipe 18. Link plates 12 for maintaining the flexuously bendable pipe unit in its flexuously bent position are pivotally connected at one end thereof to the corresponding link joints 17 by means of link pins 27 and at the other end thereof to the corresponding link plates 13 by means of link pins 26. The link mechanism so constructed is connected to the annular member 7 by means of a pair of link plates 11 which are pivotally connected to the annular member 7 by link pins 28 and to the link mechanism by the uppermost link pins 26.

In the link mechanism having a structure as described above, the link plates 13 must be suitably spaced from the flexuously bendable pipe unit so as not to contact the latter at any position of the pipe unit. This is realized by constructing the link plates 12 in the form of a stepped structure. In the straight position of the flexuously bendable pipe unit, the link shafts 23 must be situated externally of the link shafts 24, while the positional relation therebetween is reversed when the flexuously bendable pipe unit is moved from its straight position to its flexuously bent position or its end-elevated position. It is therefore necessary to provide a sufficient spacing between the group of the link shafts 23 and the group of the link shafts 24 so that they may not contact with each other during the movement of the flexuously bendable pipe unit to its end-elevated position. The above positional relation between the group of the link shafts 23 and the group of the link shafts 24 varies from time to time during the movement of the flexuously bendable pipe unit from its straight position to its flexuously bent position since these link shaft groups have respectively different curvatures.

Referring to FIGS. 8 to 11, the chute pipes 18 constituting the flexuously bendable pipe unit are generally funnel-shaped so that the lower end of the upper one can fit in the upper end of the lower one to form a substantially continuous pipe as a whole in the straight position of the flexuously bendable pipe unit. Each chute pipe 18 has a peripheral wall of a fixed gradient gradually converging downwardly and a plurality of radial lugs 180 extending outwardly from the peripheral face thereof. An annular fastening member 19 having the link joints 30, 17, 16 and 15 fixed thereto is slipped on the chute pipe 18 with one end or upper end edge of the flexible impervious member 31 held between the inner peripheral face of the annular fastening member 19 and the outer peripheral face of the chute pipe 18, the annular fastening member 19 being then secured to the radial lugs 180 by means of bolts 20. The peripheral face portion about the upper end of the chute pipe 18 is chamfered to have a fixed gradient opposite to the gradient of the body portion, and an annular fastening member 22 having a plurality of depending fingers is mounted on the chamfered upper end edge of the chute pipe 18 and has its depending fingers positioned beneath the radial lugs 180 closely adjacent to the latter. The lower end edge of an adjacent flexible impervious member 31 is held between the inner peripheral face of the annular fastening member 22 and the outer peripheral face at the upper end edge of the chute pipe 18, the depending fingers of the annular member 22 being then fastened to the radial lugs 180 by means of bolts 21. The inner peripheral faces of the annular fastening members 19 and 22 may preferably have the same gradients as those of the peripheral wall and of the upper end portion of the chute pipe 18, respectively, so as to ensure tight fit of these members 19 and 22 on the chute pipe 18. The chute pipe 18 may have the shape of a cone or a pyramid.

For applications where the conveying velocity of bulk material may be somewhat sacrified to the simplicity of the apparatus, the flexible impervious members 31 may be eliminated to allow for free communication with ambient air, and a plurality of deflectors may be continuously arranged to constitute a flexuously bendable pipe unit of the non-sealed type. It is to be understood that the term "flexuously bendable pipe unit" in the present invention is intended to include not only chute pipes hermetically sealingly connected with each other but also deflectors connected in a manner as described above.

The present invention having the above features exhibits the following notable advantages over the prior art pneumatic bulk material transport apparatus:

(1) Reduction in pressure loss.—In the pneumatic conveying pipe apparatus heretofore employed in the art, its stationary pipe was bent to a fixed angle of, for example, 90°, and its flexible pipe was fixedly supported solely at the tip portion and the base portion thereof. In view of the above manner of support, the intermediate portion of the flexible pipe was left to freely depend and it was thus unable to bend the flexible pipe to a desired angle.

However, the pipe apparatus according to the present invention can be bent to any desired angle under remote control or automatically. Therefore, pressure loss and power consumption can be reduced to a minimum by setting the pipe apparatus at such an angular position at which the resistance encountered by a bulk material being conveyed will always become minimum.

Further, in the prior art pipe apparatus having the stationary bent pipe, the flow of bulk material was non-uniformly concentrated along the outer curvature of the bent portion of the pipe, and the strong friction developed between the bulk material and the inner wall at the outer curvature of the bent portion of the pipe tended to separate the flow of bulk material from the flow of entraining air thereby to bring forth undesirable plugging of the bent pipe.

According to the present invention, only a portion of bulk material contacts a part of the inner walls of the chute pipes and the greater portion of the bulk material flows uniformly and freely through the space defined within the chute pipes without any direct contact with the inner walls of the chute pipes. Friction loss is thereby remarkably reduced with the result that no plugging takes place and an increased solid-air mixture ratio can be obtained, which leads to a highly uniform bulk material flow.

(2) Increased solid-air mixture ratio.—In the prior art pipe apparatus of this kind, the bent pipe was the most objectionable bottleneck for the desired increase in the solid-air mixture ratio, and the solid-air mixture ratio had to be limited to a low value in view of the tendency of bulk material to plug the apparatus at the bent pipe portion. The resistance encountered by bulk material being conveyed is extremely largely variable depending on the kind of bulk material. For example, a bulk material such as wheat which has a fixed repose angle and a flat smooth surface, and a bulk material such as wood chips or rock salt which has an uncertain repose angle and is of a binding nature, have respective maximum conveyable solid-air mixture ratios which are remarkably different from each other under the same conditions. Therefore, with the prior art pipe apparatus whose bent pipe was not adapted to vary its angle depending on the kind of bulk material, the pipe apparatus was soon plugged with a bulk material showing a high resistance against pneumatic conveyance and the solid-air mixture ratio had to be reduced to a very low value.

In the present invention, however, the angle of the flexuously bendable pipe portion can be freely varied to suit a specific bulk material to be penumatically conveyed, and the optimum angle can be selected for the unobstructed penumatic conveyance of the bulk material. The capability of selecting a maximum allowable solid-air mixture ratio, therefore, increases the transport capacity and improves the economy of the bulk material transport.

(3) Improvement in space filling ratio.—The deflector apparatus is generally used for the shipping of bulk material by means of pneumatic conveyance. In a cargo ship, the hatchway covering the cargo hold is surrounded by a hatch coaming of substantial height which is provided for increasing the strength of the hull structure. Because of the presence of the hatch coaming, not only the hold space situated directly at the rear side of the hatch coaming extending below the deck into the hull but also the hold space defined by the repose angle of a specific bulk material at which the bulk material will settle with the uppermost position thereof corresponding to the peripheral edge of the lower end of the hatch coaming were unavoidably left as dead space, and the void space generally occupied at much as 15% of the total hold volume. Even by the forced discharge of bulk material by the deflector apparatus, the bulk material could only be spread through an angle of 60° to 70° at the most, and a spreading angle of forced discharge beyond the above limit resulted in plugging of the deflector apparatus.

The flexuously bendable pipe unit in the apparatus according to the present invention is a continuous pipe which is sealingly covered with a plurality of flexible impervious members and is therefore flexuously bendable to an angle of 180° without developing the undesirable plugging. The flexuously bendable pipe unit permits discharge of bulk material even to a hold area which has heretofore been left as a dead space, thus enabling to make a 100% utilization of the hold volume, reducing the freight and remarkably increasing the transport capacity.

Further, in the conventional shipping operation with the deflector apparatus, the friction loss encountered by bulk material due to impingement against the deflector plates results in an excessive reduction in the discharge velocity, and in case of bulk material, such as wood chips which are flat in shape and have a high gap rate, the space occupying ratio does not substantially differ from the space occupying ratio in the order of 37 to 38% which represents the value when the wood chips are allowed to gravitationally settle.

However, in the shipping operation with the pipe apparatus according to the present invention, little friction loss in the flexuously bendable pipe unit ensures a high flow velocity of the solid-air mixture throughout the pipe unit and at the discharge port. Therefore, wood chips leaving the discharge port will proceed with their flat faces directed to the discharge direction due to the air resistance exerted thereon and will be forcedly stacked up on an unloading area by a considerable force of impact. Thus, in the case of the wood chips, an about 16% increase in the space occupying ratio, amounting to about 44%, can be effected compared with the gravitational free fall, thereby increasing the transport capacity and reducing the freight.

(4) Remarkable increase in conveying capacity.—The flexible pipe in the prior art pipe apparatus was connected to the upper structure in such a manner that the flexible pipe as a whole can be lifted by the upper structure, but the tip portion of the flexible pipe had to be supported manually or by some suitable means. In view of the above manner of structural arrangement, the weight of the flexible conveyor pipe was a weighing factor which in itself set a limit in the conveying capacity.

However, by virtue of the fact that the flexuously bendable pipe unit in the pipe apparatus according to the present invention can be bent to any desired angle automatically or under remote control, there is no limit in the weight of the conveyor pipe whose diameter can therefore be enlarged as desired and the conveying capacity can remarkably be increased.

What is claimed is:

1. A pipe apparatus for the pneumatic conveyance of bulk material comprising a stationary pipe, a revolving pipe revolvably connected at one end thereof with an end of said stationary pipe in concentric relation therewith, a flexuously bendable pipe unit connected at one end thereof with another end of said revolving pipe, first drive means for causing the revolving movement of said revolving pipe and said flexuously bendable pipe unit, second drive means for flexuously bending said flexuously bendable pipe unit thereby causing elevating movement of the opposite end thereof, and an elevating link mechanism operatively connected with said flexuously bendable pipe unit and operative in response to the operation of said second drive means to cause the elevating movement of said opposite end of said flexuously bendable pipe unit so that said flexuously bendable pipe unit can take any desired angular shape.

2. A pipe apparatus according to claim 1, in which said flexuously bendable pipe unit comprises a plurality of chute pipes sealingly connected with each other by means of flexible impervious members, and said elevating link mechanism comprises link joint means secured respectively to each said chute pipe on one or extensible side and on the other or non-extensible side of said flexuously bendable pipe unit, link joint means secured to said another end of said revolving pipe on the extensible side and on the non-extensible side of said flexuously bendable pipe unit at positions corresponding to the positions of said first-mentioned link joint means, those of said first-mentioned and second-mentioned link joint means which are secured to said chute pipes and said revolving pipe on the non-extensible side of said flexuously bendable pipe unit being pivotally connected with each other, a plurality of link plate means disposed in pairs on opposite sides of said flexuously bendable pipe unit in vertically spaced relation from each other, said link plate means forming each pair having one end thereof pivotally connected by means of a link shaft with those of said first-mentioned link joint means which are secured to each said chute pipe on the extensible side of said flexuously bendable pipe unit and having the other end thereof pivotally connected with each other by means of a link shaft on the non-extensible side of said flexuously bendable pipe unit and further pivotally connected with the corresponding end of the adjacent link plate, means for connecting link means, supporting link means pivotally connected at one end thereof with each said link plate means at a position substantially intermediate between said opposite ends of the latter and at the other end thereof with the corresponding one of said chute pipes, and a pair of actuating link means pivotally connecting the uppermost pair of said link plate means with said second drive means at said intermediate position, whereby said elevating link mechanism is operative in response to the operation of said second drive means to cause the flexuously bending movement of said flexuously bendable pipe unit in any desired curvature with the extensible side of said flexuously bendable pipe unit drawing an arc about the non-extensible side thereof.

3. A pipe apparatus according to claim 1, in which said flexuously bendable pipe unit comprises a plurality of chute pipes sealingly connected with each other by means of flexible impervious members, each said chute pipe being so shaped that its body portion converges gradually downwardly with a fixed gradient and its upper end edge portion is chamfered to have a gradient opposite to the gradient of said body portion, and having a plurality of radial lugs extending outwardly from the outer peripheral face thereof, one end of said flexible impervious member which connects adjacent ones of said chute pipes being fastened between said chamfered face and a first annular fastening member which engages said chamfered face and is held in place by means of fastening bolts screwed into said radial lugs, while the other end of said flexible impervious member being fastened between the outer peripheral face of said body portion and a second annular fastening member which engages said body portion and is held in place by means of fastening bolts screwed into said radial lugs, whereby said chute pipes are sealingly and flexuously bendably connected with each other.

References Cited

UNITED STATES PATENTS 3,075,813  1/1963  Vohl _____ 302—61
3,269,780  8/1966  Hanson _____ 302—60

ANDRES H. NIELSEN, Primary Examiner

U.S. Cl. X.R.

193—16; 214—17